Dec. 18, 1934.    L. O. BEARD    1,984,960
TOOL FOR REMOVING BEARINGS
Filed June 4, 1934    2 Sheets-Sheet 1
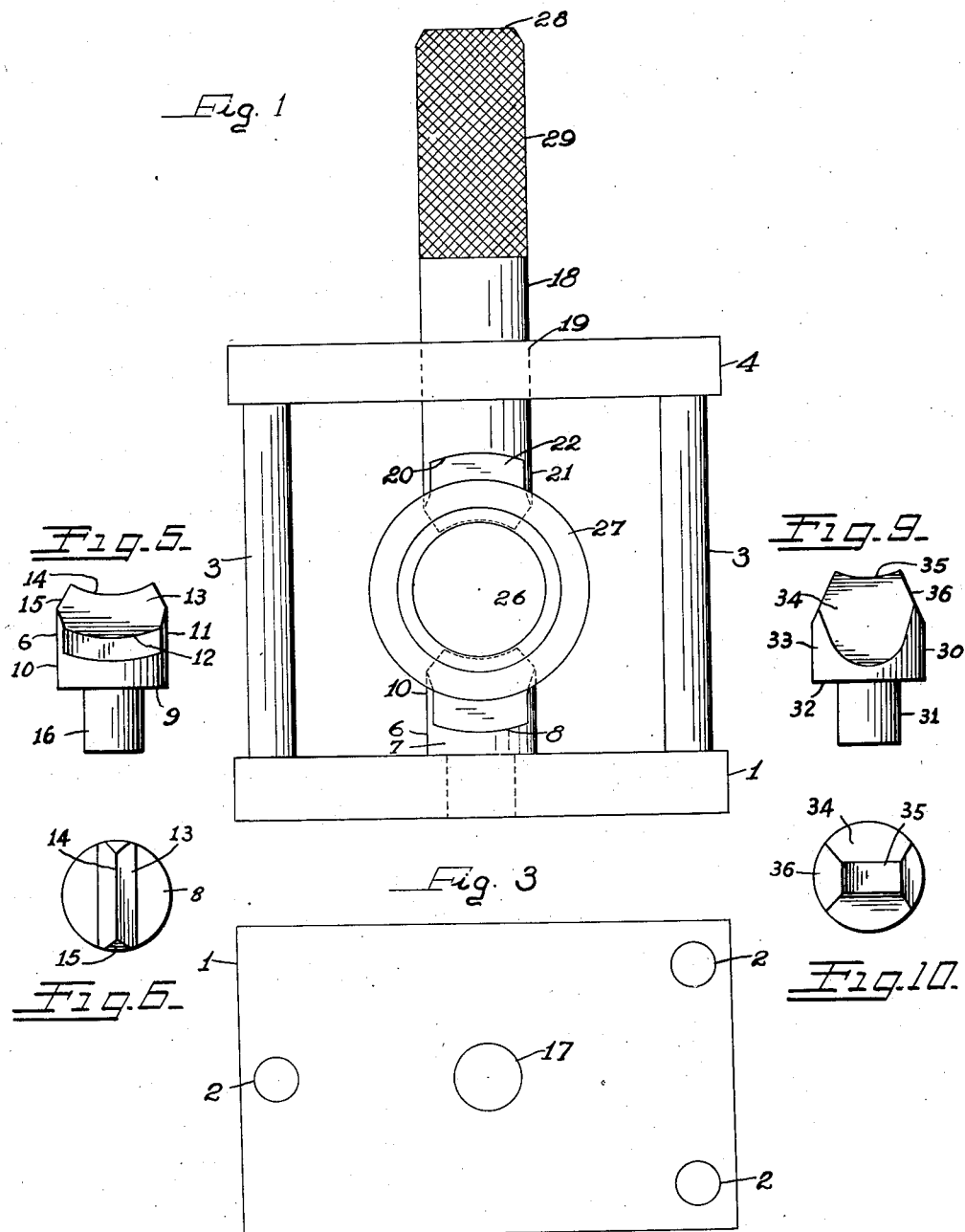
Inventor
Lawrence O. Beard
By Percy H Moore
Attorney Dec. 18, 1934.  L. O. BEARD  1,984,960
TOOL FOR REMOVING BEARINGS
Filed June 4, 1934   2 Sheets-Sheet 2
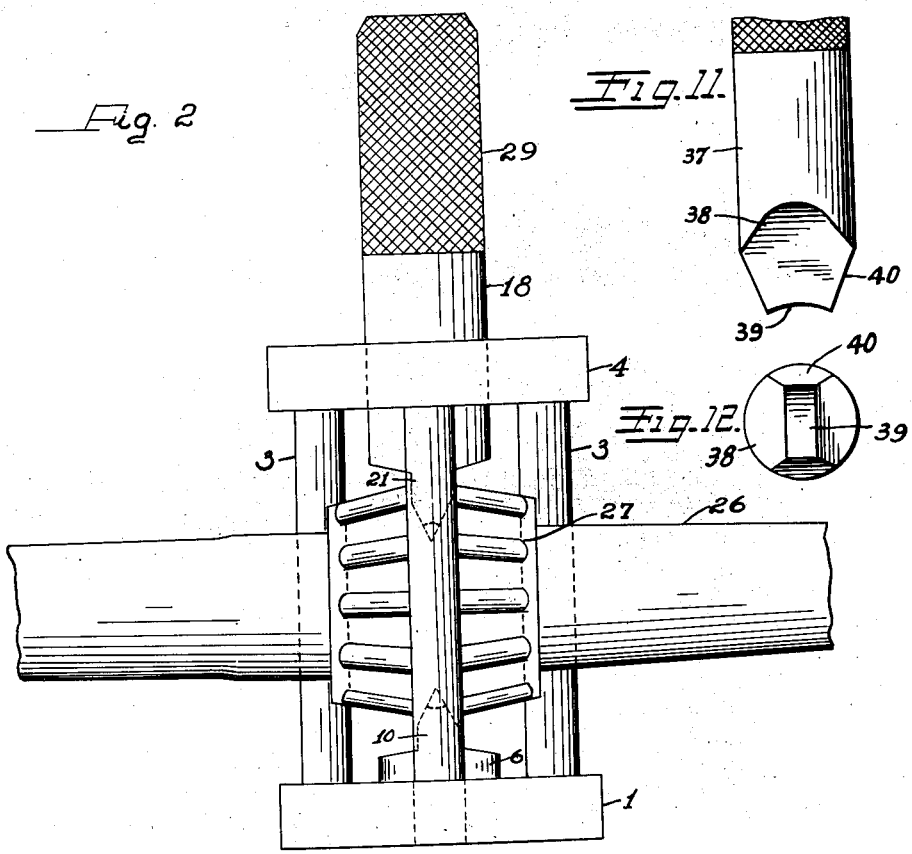
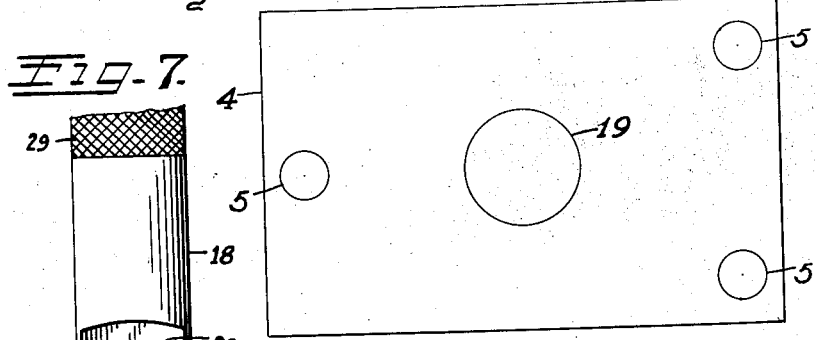
Inventor
Lawrence O. Beard
By Percy H Moore
Attorney Patented Dec. 18, 1934

1,984,960

UNITED STATES PATENT OFFICE 1,984,960

TOOL FOR REMOVING BEARINGS

Lawrence O. Beard, Lancaster, Pa.

Application June 4, 1934, Serial No. 729,027

6 Claims. (Cl. 254—104)

My invention relates to a tool for removing bearings from their shafts, and is particularly adapted for removing bearings arranged in pairs, as for example the bearings on automobile axles.

Heretofore it has been the practice to remove these bearings, which are tightly driven on or in other ways jammed on the axles by driving a chissel between the bearings, in order to wedge them apart. Furthermore it has been the practice to clamp bearing pullers around the bearings and then by means of pressure, pull or force the bearings from the axle. Both these and other methods have proven unsatisfactory due to the fact that frequently the bearing surfaces and rollers are damaged to such an extent that the bearings are unsuitable for further use.

The principal object of my invention is to provide a tool by means of which bearings arranged in pairs may easily and quickly be removed from a shaft or axle without the possibility of damaging either the shaft or bearings.

Another object is to provide a tool by means of which bearings may be uniformly wedged apart and removed from the shaft or axle.

Other and more specific objects will be apparent as the specification is considered in connection with the accompanying drawings, in which:

Figure 1 is a side elevation of the tool in operative position on the timken bearing of an axle;

Figure 2 is an end elevation of the tool in operation, showing the bearings in position prior to removal;

Figure 3 is a plan view of the base member of the tool;

Figure 4 is a plan view of the top or upper member of the tool;

Figure 5 is a side elevation of the lower spreading anvil;

Figure 6 is a plan view of the spreading anvil;

Figure 7 is a fragmentary side elevation of the vertically shiftable wedge or spreading member;

Figure 8 is an end view of the spreading member;

Figure 9 is a side elevation of the enlarged spreading anvil;

Figure 10 is a plan view of the enlarged spreading anvil;

Figure 11 is a fragmentary side elevation of the enlarged movable spreading member; and Figure 12 is a plan view of the said letter spreading member.

Referring more specifically to the drawings, 1 denotes a rectangular heavy, tool steel base member, having circular holes 2, preferably three in number, formed therein for the reception of three metal supporting posts or rods 3 of suitable length. A guide or upper member 4 of tool steel, corresponding in shape and size with the base 1, is positioned a suitable distance above the base by means of the posts 3, the upper ends of which fit and are suitably retained in holes 5 in the guide member.

A spreading anvil or wedge 6, preferably of tempered steel, comprising a circular base portion 7 having a slightly concave upper surface 8 and a flat bottom face 9, is supported by the base member 1. This base portion 7 is formed with a wide, rectangularly shaped wedge portion 10, centrally located on and extended across the concave surface 8 of the base. The ends 11 of the wedge portion 10, in effect form a continuation of the peripheral wall of the circular base. The converging sides 12 of the wedge which are slightly concave, as at 13, form a substantially keen, slightly concave wedging edge 14 at the upper part of the wedge portion 10; and the upper portions of the wedge ends 11 are chamfered and slightly concave, as at 15. A round stem 16 extends downwardly from the flat bottom surface 9 of the spreading anvil and is rotatably mounted in a centrally located round bore 17 in the base 1.

The upper member 4 slidably supports in its centrally located bore hole 19, a punch spreader 18, of tempered steel of similar construction to and having the same diameter as the spreading anvil 6. This punch spreader has a slightly concave surface 20 on its lower end, from which depends a substantially wide, rectangularly shaped wedge portion 21, corresponding in size and shape with the wedge portion 10 of the spreading anvil. The converging sides 22 of the wedge portion 21, which are slightly concave, as at 23, form a sharp slightly concave wedging edge 24. This edge 24 corresponds with the wedging edge 14 of the spreading anvil. The lower portions of the ends of the wedge portion 21 are chamfered and slightly concave as at 25. It will thus be seen that the lower end of the spreader 18 conforms in every respect with the spreading anvil 6.

When it is desired to remove the bearings 27 from an axle 26, the axle is positioned between the base and guide members with the keen wedging edges 14 and 24 of the spreading anvil and punch spreader respectively fitted in between the inner faces of the bearings. Thereupon force is applied to the end 28 of the punch spreader 18, preferably by a hammer or the like, not shown.

The spreader and shafts are forced downwardly and both wedge members 10 and 21 enter in between the bearings 27 and cause the bearings to be spread or forced apart a distance equal to the approximate width of the wedging members 10 and 21, or substantially one half an inch. The upper portion of the spreader 18 is knurled, as at 29, to facilitate handling and positioning of the spreader. It will be noted that the tapered and slightly concave sides 13 and 23, the chamfered and slightly concave upper end portions 15 and 25, and the slightly concave wedging edges 14 and 24 of the spreading anvil and punch spreader respectively, effect a four point contact between the bearings and the wedging members 10 and 21, thus avoiding surface contact with the bearings during the wedging operation, and consequently lessening the possibility of any damage to the inner surfaces of the bearings and rollers.

Upon completion of the above described wedging and spreading operation, the spreading anvil and spreader are removed and a similarly constructed second spreading anvil 30 and punch spreader 37, of increased spreading capacity or dimensions, are substituted. The anvil 30 is formed with a stem 31 extending downwardly from a flat bottom surface 32, and is adapted to be rotatably mounted in the bore 17 of the base 1. This anvil 30 also comprises a cylindrical upstanding portion 33 having tapered and slightly concave sides 34 formed thereon and a substantially wide, rectangular, and slightly concave wedging surface 35. The surface 35 is located at the outer end of upstanding portion 33, and the ends of this surface are chamfered and slightly concave as at 36. While the diameter of the anvil 30 conforms with the diameter of the anvil 6 it will be noted that the wedging portion 33 presents a much blunter wedging face than that of the anvil 6. A second punch spreader 37, of the same diameter as spreader 18, is adapted to be slidably supported in the bore 19 of the guide member 4. The outer end of the spreader 37 has downwardly tapered and slightly concave sides 38, which terminate in a substantially wide, rectangular, and slightly concave wedging face 39, which face is chamfered and slightly concave, as at 40. It will be noted that the end of the spreader 37 conforms in size and shape with the spreading anvil 30.

The axle 26 is now again positioned between the base 1 and guide 4, so that it will contact the wedging face 35 of the anvil 30, and then the spreader 37 is inserted through the bore 19 of the guide member and force is applied to the outer end 41 thereof so that the spreader and axle move downwardly, with the wedging faces 39 and 35 of the spreader and spreading anvil respectively, in between the bearings 37 for wedging and forcing the bearing further apart.

While I have described and illustrated my invention as applied to bearings it is obvious that it may readily be used for removing other parts wedged on shafts and the like.

Having thus described my invention:
What I claim is:

1. A tool for removing bearings arranged in pairs from shafts comprising a base member, a guide member arranged above said base member in spaced relation with respect thereto, means for connecting and spacing said member, and removable wedging members rotatably mounted in said base and guide members, said wedging members being adapted to be shifted relatively toward each other to cause the bearings to be wedged apart.

2. A tool for removing bearings from shafts comprising metal base and guide members, spacing posts connected thereto for retaining said guide member a suitable distance above and in alinement with said base member, a wedging element having an upstanding wedging portion thereon, rotatably mounted in said base member, said upstanding wedging portion having tapered sides and concave wedging ends formed thereon, and a punch spreader extending shiftably through an aperture in said guide member, the lower end of said punch spreader having tapered sides and concave wedging ends formed thereon, said spreaders being axially aligned for cooperation in wedging apart the bearings.

3. A tool for removing bearings from shafts comprising substantially rectangular heavy metal base and upper guide members, means for spacing and connecting said upper and lower members a suitable distance apart in vertical alinement, an interchangeable anvil spreader element rotatably mounted in a centrally located aperture in said base member, said element having an upstanding portion thereon formed with tapered concave sides and a concave wedging end, and a punch spreader extending through a centrally located aperture in said upper guide member, said punch spreader having tapered concave sides, and concave wedging outer ends on said spreader cooperating to wedge apart the bearings of said spreaders.

4. A tool for removing bearings from a shaft comprising opposed supporting members aligned in spaced relation with respect to each other, a spreading anvil removably and rotatively supported in one of said members, and a spreading device slidably and rotatably supported in the other of said members in axial alignment with respect to said spreading anvil for cooperation therewith, said spreading anvil and spreading device including equally inclined wedging surfaces for effecting parallel movement of said bearings on said shaft during removal operations.

5. A tool for removing bearings from a shaft as described in claim 4, wherein the inclined wedging surfaces of said spreading anvil and said spreader are concave for effectively supporting the tool during removal operations.

6. A tool for removing bearings from a shaft, comprising opposed supporting members aligned in spaced relation with respect to each other, a spreading anvil removably and freely rotatably supported in one of said members, and a punch spreader slidably and rotatably supported in the other of said members in axial alignment with respect to said spreading anvil for cooperation therewith, said spreading anvil and punch spreader including equally inclined concave wedging surfaces having chamfered edges for effecting parallel movement of the bearings to be removed from said shaft.

LAWRENCE O. BEARD.